(12) United States Patent
Hilyard et al.

(10) Patent No.: US 7,796,643 B1
(45) Date of Patent: Sep. 14, 2010

(54) SOURCE AND EVENT BASED PARAMETER DETERMINATION

(75) Inventors: Trey A. Hilyard, Olathe, KS (US); Larry H. Piercy, St. Joseph, MO (US); Alex A. Zhang, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 533 days.

(21) Appl. No.: 11/682,923

(22) Filed: Mar. 7, 2007

(51) Int. Cl.
*H04J 3/16* (2006.01)

(52) U.S. Cl. ............... 370/467; 370/401; 370/466; 370/352; 370/356

(58) Field of Classification Search ............ 370/401, 370/352–356, 466, 467
See application file for complete search history.

(56) References Cited

U.S. PATENT DOCUMENTS

| | | | |
|---|---|---|---|
| 6,614,781 B1 * | 9/2003 | Elliott et al. ............ | 370/352 |
| 6,747,970 B1 * | 6/2004 | Lamb et al. ............ | 370/352 |
| 7,142,534 B1 * | 11/2006 | Whent et al. ............ | 370/352 |
| 2005/0152528 A1 * | 7/2005 | Newman et al. ............ | 379/229 |
| 2006/0149811 A1 * | 7/2006 | Bennett et al. ............ | 709/203 |
| 2006/0240861 A1 * | 10/2006 | Wang ............ | 455/550.1 |

OTHER PUBLICATIONS

RFC3398—Integrated Services Digital Network (ISDN) User Part Networking Group Request for Comments: 3398 Category: Standards Track Dec. 2002.*

* cited by examiner

*Primary Examiner*—Hong Cho
*Assistant Examiner*—Ajay P Cattungal

(57) ABSTRACT

A call processing system in a destination network associated with a destination signaling protocol comprises an interface configured to receive first signaling for a call placed by a user from a device in a source network, wherein the first signaling indicates a source signaling protocol associated with the source network, and a processor configured to determine a status for the call, determine an event by which the status is conveyed to the user based on the status, determine a parameter based on the event and the source signaling protocol, and generate second signaling indicating the parameter.

13 Claims, 7 Drawing Sheets

| SIGNALING PROTOCOL | EVENT | PARAMETER |
|---|---|---|
| X 1.0 | RINGBACK | A1 |
| X 1.0 | BUSY | A |
| X 1.0 | FAST BUSY | B1 |
| X 2.0 | RINGBACK | A1 |
| X 2.0 | BUSY | B1 |
| X 2.0 | FAST BUSY | C1 |
| Y | RINGBACK | A |
| Y | BUSY | B |
| Y | FAST BUSY | C |

EVENT PARAMETER TABLE 400

SOURCE AND EVENT BASED PARAMETER DETERMINATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communications, and in particular, to determining communication signaling parameters.

2. Description of the Prior Art

Signaling protocols enable destination networks to pass parameters for inducing events on source networks. Typically, the parameters in reply signaling induce an event at the caller's device to alert the caller of the status of the call, such as a ring-back tone, slow busy signal, or a fast busy signal. In the prior art, the destination network determined a parameter for reply signaling based on the status of a call. For example, user A on a source network places a call to user B on a destination network. The destination network determines that user B is available and sends a parameter within reply signaling back to the source network to induce a ring-back sound on user A's device.

Often times, the signaling protocols of the source and destination networks differ and signaling gateways are employed to translate signaling at an interface between the two networks. Parameters sent from the destination network are translated at the gateway according to instructions from the source network operator, regardless of the signaling protocol of the source network. Typically, the destination network could rely upon a stable translation between the destination and source protocols.

Recently, voice over internet protocol (VOIP) telephony has become a popular service. Many variations of signaling have been developed to support VOIP because VOIP signaling can be easily customized and modified to provide enhanced service to VOIP users. Due to the ease with which network operators can modify source protocols, other networks can no longer assume that the same parameter selection by the destination network will induce the same event in every source network. As a result, when destination networks send event-inducing parameters to source networks, source networks oftentimes initiate or direct events that are not desired by the destination networks.

What is needed is a system that allows a destination network to predictably induce events on devices communicating across communication networks regardless of the source signaling protocol.

SUMMARY OF THE INVENTION

An embodiment of the invention helps solve the above problems and other problems by generating signaling in a destination network that includes a parameter value associated with the signaling protocol of the source network for triggering the desired event. By basing the parameter on the desired event and the signaling protocol of the source network, it is possible to predictably induce an event.

In an embodiment of the invention, a call processing system in a destination network associated with a destination signaling protocol comprises an interface configured to receive first signaling for a call placed by a user from a device in a source network, wherein the first signaling identifies a source signaling protocol associated with the source network, and a processor configured to determine a status for the call, determine an event by which the status is conveyed to the user based on the status, determine a parameter based on the event and the source signaling protocol, and generate second signaling indicating the parameter.

In an embodiment of the invention, the source network generates event signaling based on the parameter to trigger the event on the device.

In an embodiment of the invention, the destination signaling protocol is different than the source signaling protocol.

In an embodiment of the invention, the destination signaling protocol is SS7.

In an embodiment of the invention, the destination signaling protocol is SS7.

In an embodiment of the invention, the source signaling protocol is SIP.

In an embodiment of the invention, a method of operating a call processing system in a destination network comprises receiving first signaling for a call placed by a user from a device in a source network, wherein the first signaling identifies a source signaling protocol, determining a status for the call, determining an event by which the status is conveyed to the user based on the status, determining a parameter based on the event and the source signaling protocol, and generating second signaling indicating the parameter.

In an embodiment of the invention, a communication network comprises a source call processing system associated with a source signaling protocol configured to receive a call placed by a user from a source device in a source network, generate a first signaling for the call, wherein the first signaling identifies the source signaling protocol, receive fourth signaling, and generate event signaling based on a parameter, whereby the source device generates an event; a gateway configured to receive the first signaling, generate a second signaling indicating the source signaling protocol based on the first signaling, the source signaling protocol, and a destination signaling protocol, receive third signaling, and generate the fourth signaling based on the third signaling, the parameter, the destination signaling protocol, and the source signaling protocol; and a destination call processing system configured to receive the second signaling, determine a status for the call, determine the event by which the status is conveyed to the user, determine a parameter based on the event and the source signaling protocol, and generate the third signaling indicating the parameter.

In an embodiment of the invention, a method of operating a communication network comprises receiving a call placed by a user from a source device in a source network, generating a first signaling for the call, wherein the first signaling identifies a source signaling protocol, receiving the first signaling, generating a second signaling indicating the source signaling protocol based on the first signaling, the source signaling protocol, and a destination signaling protocol, receiving the second signaling, determining a status for the call, determining the event by which the status is conveyed to the user, determining a parameter based on the event and the source signaling protocol, generating third signaling indicating the parameter, receiving third signaling, generating the fourth signaling based on the third signaling, the parameter, the destination signaling protocol, and the source signaling protocol, receiving the fourth signaling, generating event signaling based on a parameter, whereby the source device generates an event.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
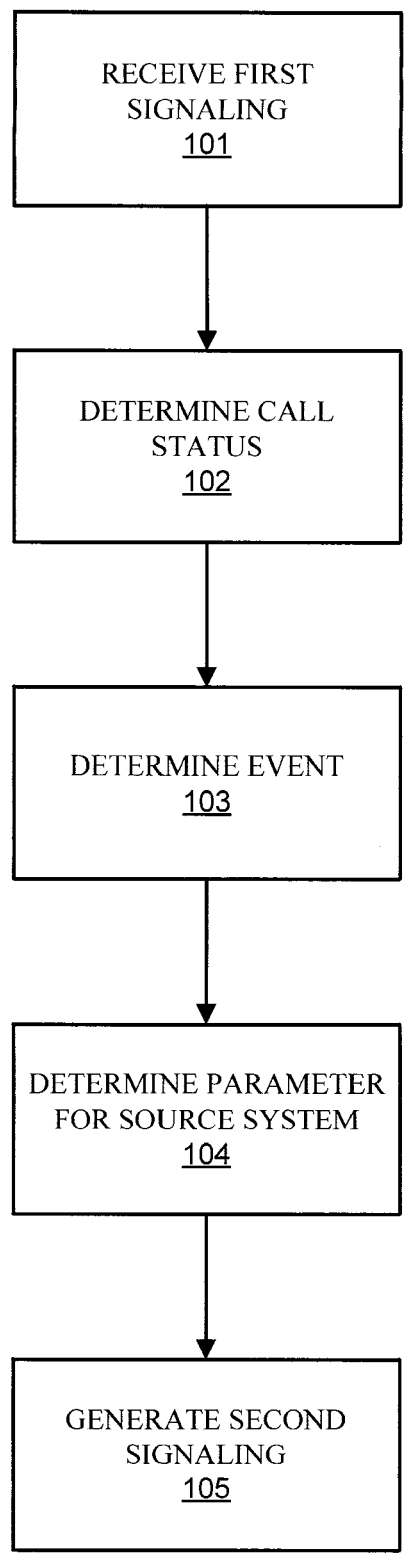
FIG. 1 illustrates the operation of a call processing system in an embodiment of the invention.

FIG. 1 illustrates the operation of a call processing system in an embodiment of the invention. A call processing system could be any system capable of receiving, generating, and processing signaling for a call to provide call services. Examples of call processing systems are class 5 telephone switches, network switching subsystems, and mobile switching centers.

Typically, a user on a source device in a source network places a call to a user in a destination network. A call processing system receives first signaling for the call. (Step 101). The first signaling indicates the source signaling protocol of the source network. The source signaling protocol could be identified through a network address, a parameter indicating the destination network or the source signaling protocol, or any other method capable of indicating the source signaling protocol to the call processing system. The source signaling protocol could be the same as the destination network signaling protocol, or a different signaling protocol. Examples of signaling protocols are signaling system 7 (SS7), session initiation protocol (SIP), H.323, or any signaling protocol capable of being identified by a first signaling in a source network.

The call processing system determines the status of the call. (Step 102). The status could indicate that the destination device is available, the destination device is unavailable, that there is no available bearer path to the destination device, or any other status capable of being conveyed to a user by an event. The call processing system then determines the event to be induced on the source device to convey the status of the call to the user. (Step 103). The event could be a ring back signal, a busy signal, or any other event capable of conveying the status of a call to a user.

Based on the event and the source signaling protocol, the call processing system determines a parameter to include in a second signaling. (Step 104). The parameter enables the source network to convey the status of the call to the user by generating the event on the source device. The parameter could be any data capable of being indicated in a signaling such that a source network is capable of generating an event on a source device. The call processing system then generates the second signaling indicating the parameter. (Step 105).

In an advantage, the signaling received by the call processing system indicates the signaling protocol of the source network, thereby facilitating the selection of the proper parameter to induce the desired event. The source network could be identified through signaling generated at the source device, or through signaling generated at a node within the source network.

Figure 2:
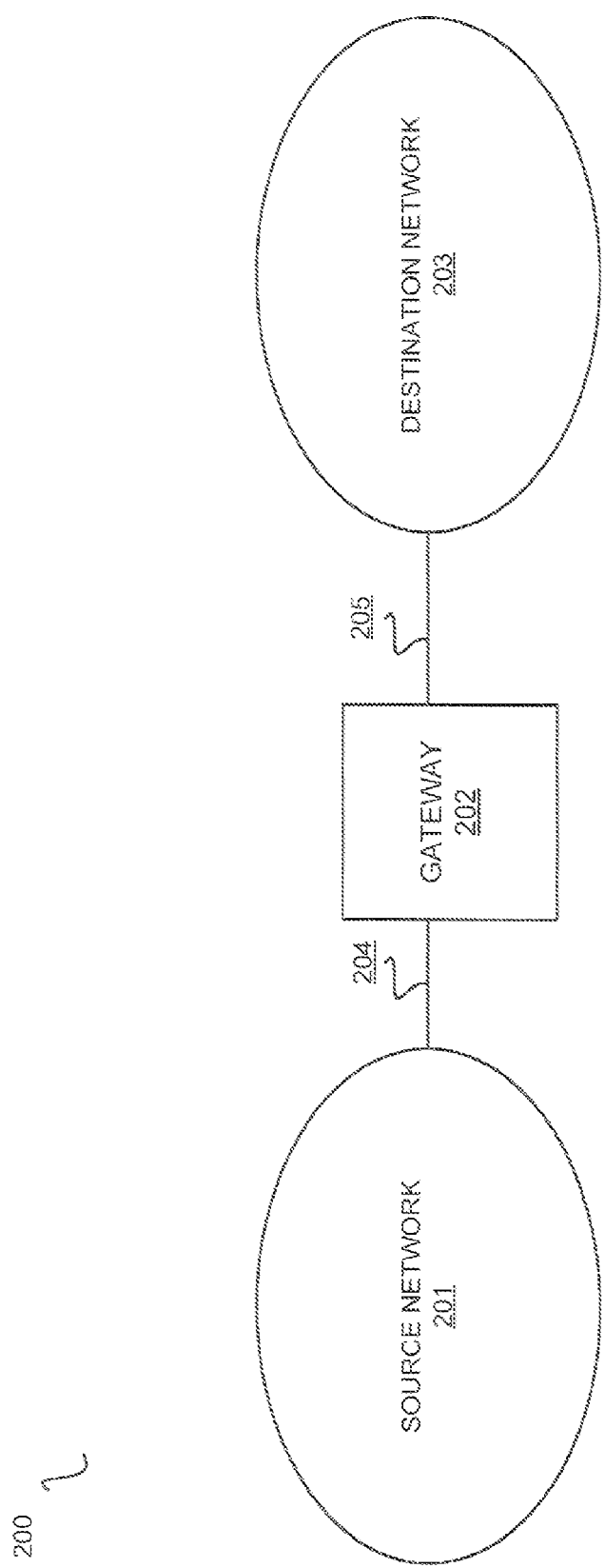
FIG. 2 illustrates a communication network in an embodiment of the invention.

FIG. 2 illustrates communication network 200 in an embodiment of the invention. Communication network 200 comprises source network 201, gateway 202, destination network 203, and signaling protocols 204 and 205. Source network could be coupled to, connected to, or otherwise exchanging signaling with gateway 202 utilizing signaling protocol 204. Gateway 202 could be coupled to, connected to, or otherwise exchanging signaling with destination network 203 utilizing signaling protocol 205. Examples of signaling protocols are SS7, session initiation protocol (SIP), H.323, or any signaling protocol capable of being received and generated by gateway 202, source network 201, and destination network 203.

Source network 201 or destination network 203 could be any network or collection of networks capable of receiving a call, receiving signaling for a call, and generating signaling for a call indicating signaling protocol 204 or signaling protocol 205. Examples of source network 201 and destination network 203 are the public switched telephone network (PSTN), computer networks, and the Internet. Gateway 202 could be any network node capable of interfacing networks with different signaling protocols, receiving first and third signaling for a call, and generating second and fourth signaling for the call based on the first signaling, and signaling protocols 204 and 205.

In an operational example, a user could place a call from a source device in source network 201. Source network 201 could generate first signaling indicating signaling protocol 204. Gateway 202 could receive first signaling and generate second signaling for the call indicating signaling protocol 204 based on the first signaling, signaling protocol 204, and signaling protocol 205. Destination network 203 could receive second signaling, determine an event to be induced at the source device based on a status for the call. A status could describe a call condition regarding the destination device. Examples of a status are device available, device unavailable, and bearer path not available. Examples of events are ring back, busy signal, and fast busy signal. For example, the status could be device available, and the event, 'RING-BACK.' Destination network 203 could generate third signaling indicating a parameter based on the event and the identity of signaling protocol 204. Gateway 202 could receive third signaling and generate fourth signaling based on the third signaling, the parameter, signaling protocol 204 and signaling protocol 205. Source network 201 could receive the fourth signaling and instruct the source device to generate the event. In this example, the device could emit a ring back tone.

In an advantage, the gateway generates fourth signaling based on the parameter included in the third signaling. Because the parameter is associated with the desired event for the signaling protocol of the source network, the event can be predictably induced on the source device.

Figure 3:
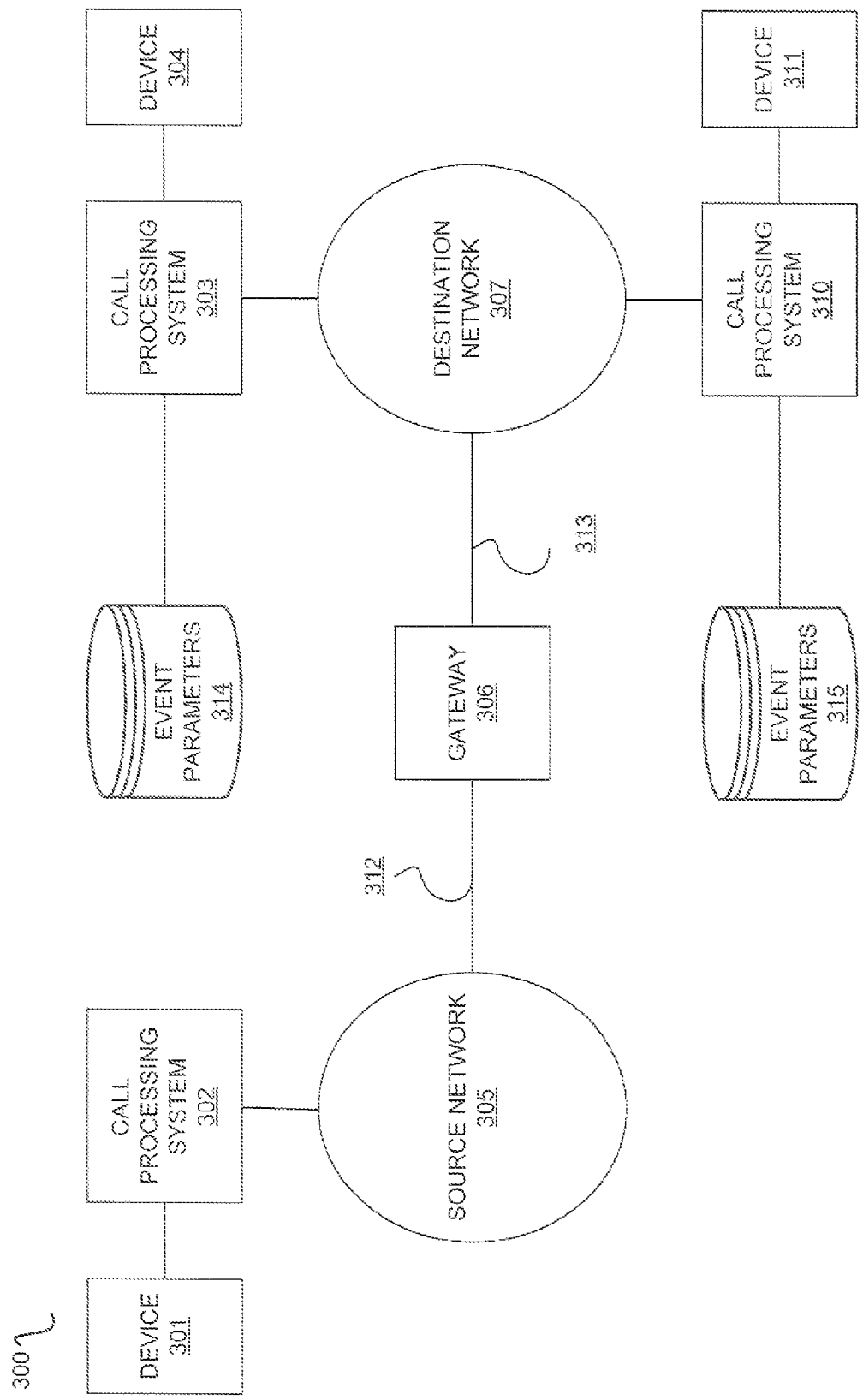
FIG. 3 illustrates a communication network in an embodiment of the invention.

FIG. 3 illustrates communication network 300 in an embodiment of the invention. Communication network 300 comprises device 301, call processing system (CPS) 302, CPS 303, device 304, source network 305, gateway 306, destination network 307, CPS 310, device 311, signaling protocols 312 and 313, and event parameters 314 and 315.

Devices 301, 304, and 311 could be coupled to, connected to, or otherwise in communication with CPS 302, CPS 303, and CPS 310, respectively. A device could be any communication device such as a telephone, a computer, or a handset.

CPS 302 could be coupled to, connected to, or otherwise in communication with source network 305. CPS 303 and CPS 310 could be coupled to, connected to, or otherwise in communication with destination network 307. A CPS could be any system capable of receiving, generating, and processing signaling for a call to provide call services. Examples of call processing systems are class 5 telephone switches, network switching subsystems, and mobile switching centers.

Source network 305 and destination network 307 could be coupled to, connected to, or otherwise in communication with gateway 306 utilizing signaling protocols 312 and 313, respectively. Examples of signaling protocols are SS7, session initiation protocol (SIP), H.323, or any signaling protocol capable of being received and generated by call processing systems 302, 303, and 310, and gateway 306. Source network 305 or destination network 307 could be any network or collection of networks capable of receiving a call, and receiving and generating signaling for a call. Examples of source network 305 and destination network 307 are the public switched telephone network (PSTN), computer networks, and the Internet.

Gateway 306 could be any network node capable of interfacing networks with signaling protocols 312 and 313, receiving first and third signaling for a call, generating second and fourth signaling for a call.

Event parameters 314 and 315 could be any data structures capable of storing and retrieving values of parameters that induce events on devices, wherein a parameter is associated with an event and a signaling protocol. Examples of data structures are indexed or keyed files, flat files, database rows and tables, and databases. It should be noted that communication network 300 indicates 2 event parameter data structures for the sake of clarity. Those skilled in the art appreciate that a data structure as described above could be implemented in several distributed sites, such as CPS 303 and 310, as a stand-alone data structure in its own installation, as part of a larger installation, or any other configuration that allows access to event parameters 314 and 315 from 303 and 310.

Figure 4:
FIG. 4 illustrates a call processing table in an embodiment of the invention.

FIG. 4 illustrates event parameter table (EPT) 400 in an embodiment of the invention. EPT 400 illustrates an embodiment of event parameters 314 and 315. EPT 400 provides a parameter associated with an event and a signaling protocol that enables source network 305 or destination network 307 to induce an event on device 301, or 304 and 311, respectively. EPT 400 could comprise 3 fields and 9 entries. The fields could comprise signaling protocol, event, and parameter.

The signaling protocols indicated in the following example are used to illustrate examples of signaling protocol versions, and do not identify any particular signaling protocols.

The first entry could comprise a signaling protocol of 'X 1.0', an event of 'RINGBACK', and a parameter of 'A1'. The second entry could comprise a signaling protocol of 'X 1.0 ', an event of 'BUSY', and a parameter of 'A'. The third entry could comprise a signaling protocol of 'X 1.0 ', an event of 'FAST BUSY', and a parameter of 'B1'.

The fourth entry could comprise a signaling protocol of 'X 2.0', an event of 'RINGBACK', and a parameter of 'A1'. The fifth entry could comprise a signaling protocol of 'X 2.0 ', an event of 'BUSY', and a parameter of 'B1'. The sixth entry could comprise a signaling protocol of 'X 2.0', an event of 'FAST BUSY', and a parameter of 'C1'.

The seventh entry could comprise a signaling protocol of 'Y', an event of 'RINGBACK', and a parameter of 'A'. The eighth entry could comprise a signaling protocol of 'Y', an event of 'BUSY', and a parameter of 'B'. The ninth entry could comprise a signaling protocol of 'Y', an event of 'FAST BUSY', and a parameter of 'C'.

Figure 5:
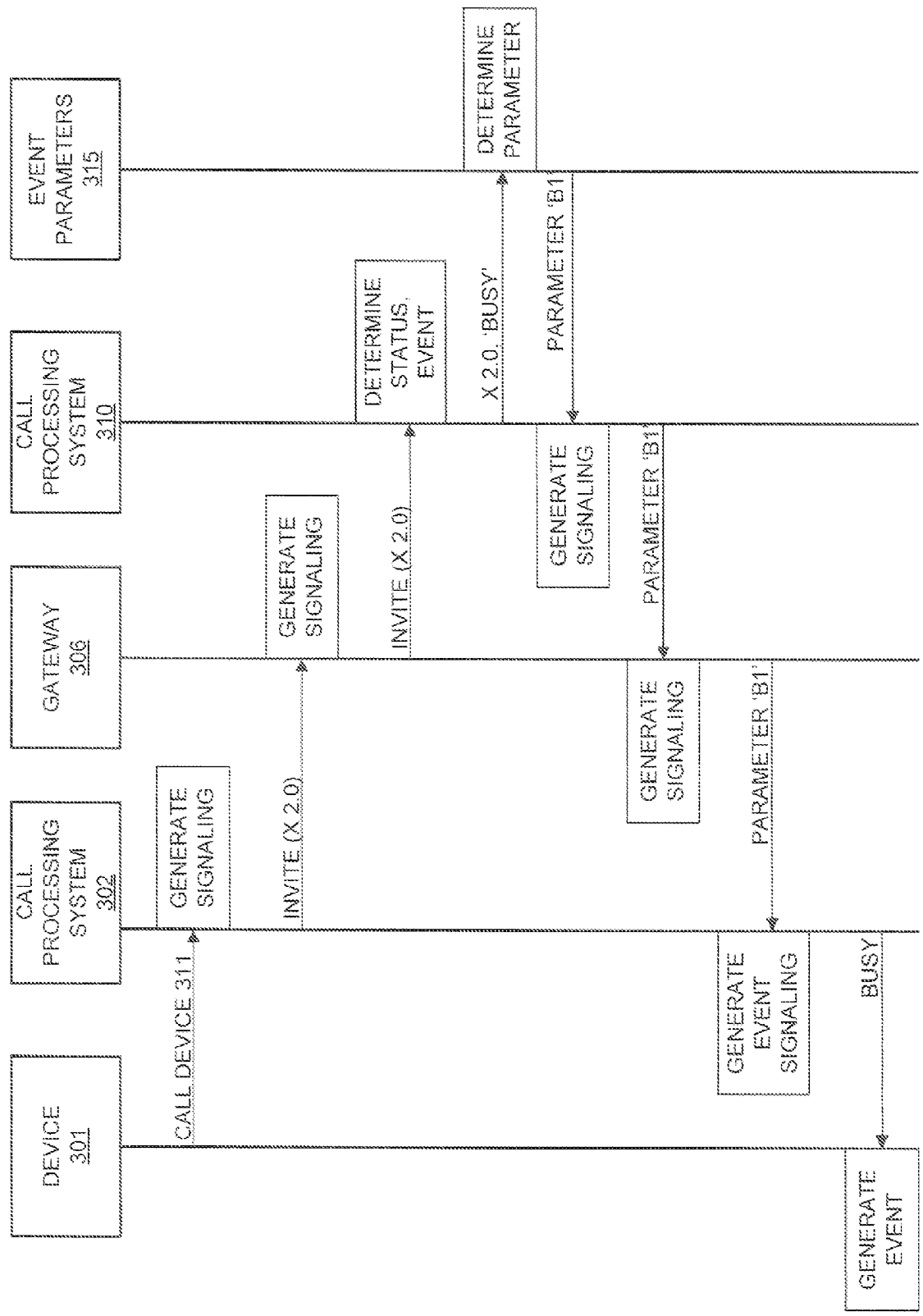
FIG. 5 illustrates the operation of a communication network in an embodiment of the invention.

FIG. 5 illustrates the operation of communication network 300 in an embodiment of the invention. A user could place a call from device 301 to device 311. CPS 302 could receive the call and generate first signaling to invite device 311 to join in a call. The first signaling could indicate source signaling protocol 312. In this example, source signaling protocol 312 could be 'X 2.0.' Gateway 306 could receive the first signaling and generate second signaling based on the first signaling, signaling protocol 312, and destination signaling protocol 313. In this example, destination signaling protocol 313 could be 'Y.'

CPS 310 could receive the second signaling and determine a status for the call. In this example, the status could be 'device 311 is unavailable.' CPS 310 could determine a 'BUSY' event based on the status. The 'BUSY' event could be induced on device 301. The CPS 310 could then query event parameters 315 for the parameter associated with signaling protocol 312 and the event. As indicated in EPT 400, the parameter associated with signaling protocol 'X 2.0 ' and event 'BUSY' could be 'B1.'

CPS 310 could generate third signaling indicating parameter 'B1.' Gateway 306 could receive the third signaling and generate a fourth signaling based on the third signaling, signaling protocols 312 and 313, and parameter 'B1.' CPS 302 could receive the fourth signaling and generate event signaling based on the parameter, whereby source network 305 instructs device 301 to emit a busy signal.

In an advantage, a CPS in a communication network with a signaling protocol different from that of another CPS through which a call is placed can predictably induce an event on the device that placed the call to convey the status of the call.

Figure 6:
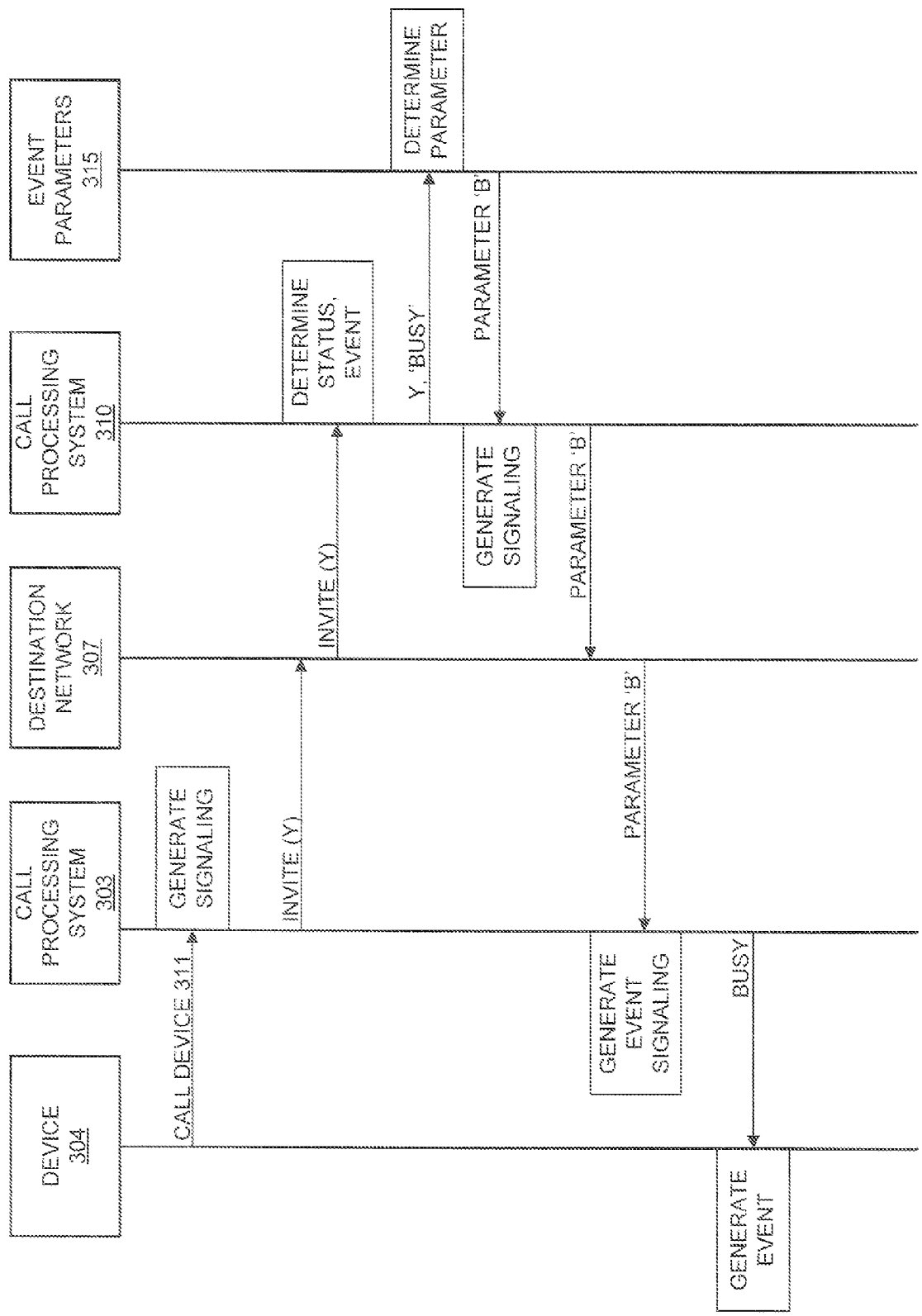
FIG. 6 illustrates the operation of a communication network in an embodiment of the invention.

FIG. 6 illustrates the operation of communication network 300 in an embodiment of the invention. A user could place a call from device 304 to device 311. CPS 303 could receive the call and generate first signaling for the call indicating signaling protocol 313. In this example, signaling protocol 313 could be 'Y.' Because device 304 and 311 are on the same communication network, there is no need for the first signaling to pass through gateway 306.

CPS 310 could receive the second signaling and determine a status for the call. In this example, the status could be 'device 311 is unavailable.' CPS 310 could determine a 'BUSY' event based on the status. The 'BUSY' event could be induced on device 304. The CPS 310 could then query event parameters 315 for the parameter associated with signaling protocol 313 and the event. As indicated in EPT 400, the parameter associated with signaling protocol 'Y' and event 'BUSY' could be 'B.'

CPS 310 could generate second signaling indicating parameter 'B.' CPS 303 could receive the second signaling and generate event signaling based on the parameter, instructing device 304 to emit a busy signal.

In an advantage, the same event could be induced on distinct devices in different communication systems by using different event-inducing parameter values. This is achieved by basing the parameter on the event and the signaling protocol of the communication network of the source device on which the event is induced.

Figure 7:
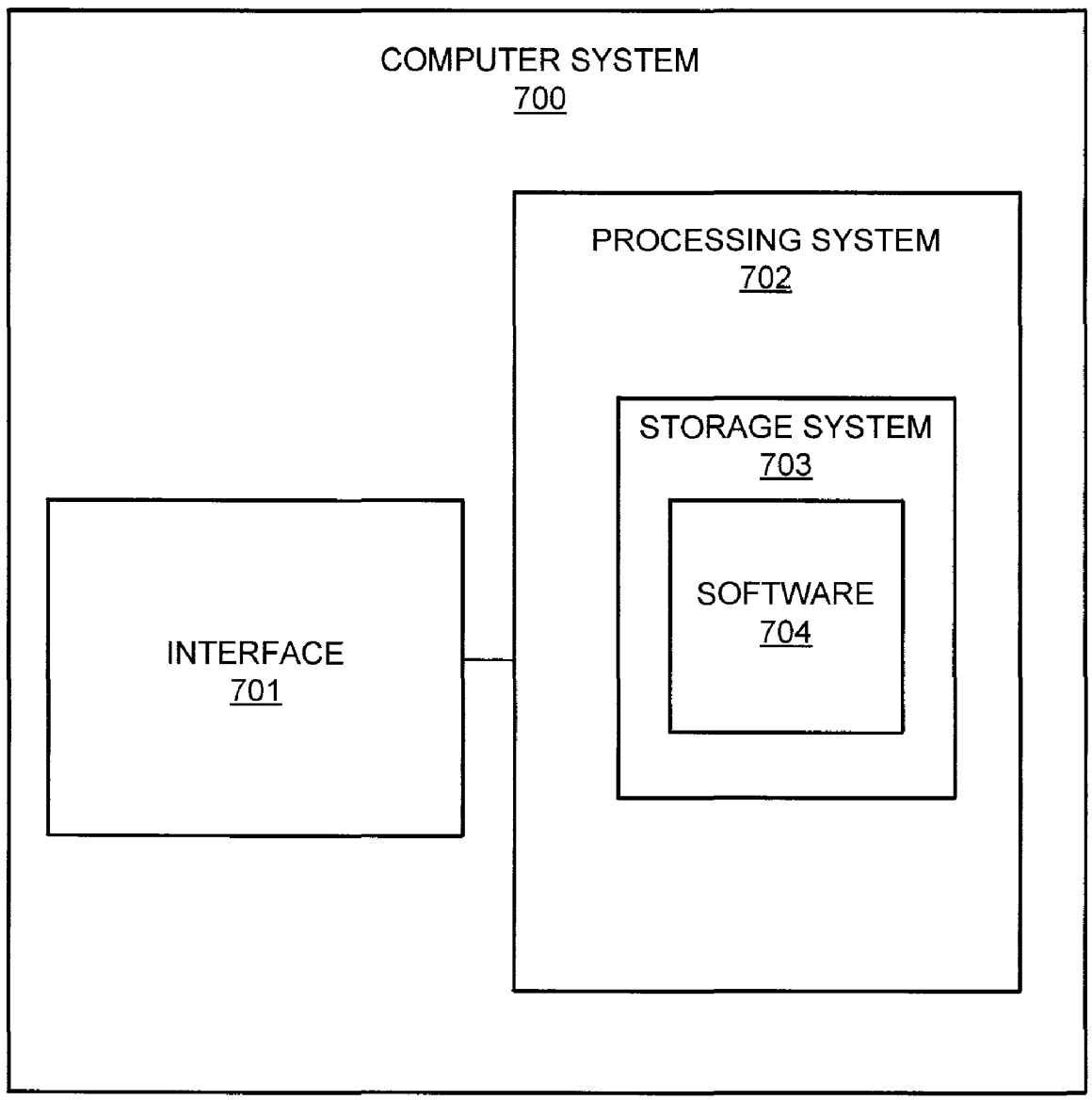
FIG. 7 illustrates a computer system in an embodiment of the invention.

FIG. 7 illustrates computer system 700 in an embodiment of the invention. Computer system 700 includes interface 701, processing system 702, storage system 703, and software 704. Storage system 703 stores software 704. Processing system 702 is linked to interface 701. Computer system 700 could be comprised of a programmed general-purpose computer, although those skilled in the art will appreciate that programmable or special purpose circuitry and equipment may be used. Computer system 700 may use a client server architecture where operations are distributed among a server system and client devices that together comprise elements 701-704.

Interface 701 could comprise a network interface card, modem, port, or some other communication device. Interface 701 may be distributed among multiple communication devices. Processing system 702 could comprise a computer microprocessor, logic circuit, or some other processing device. Processing system 702 may be distributed among multiple processing devices. Storage system 703 could comprise a disk, tape, integrated circuit, server, or some other memory device. Storage system 703 may be distributed among multiple memory devices.

Processing system 702 retrieves and executes software 704 from storage system 703. Software 704 may comprise an operating system, utilities, drivers, networking software, and other software typically loaded onto a general-purpose computer. Software 704 could also comprise an application program, firmware, or some other form of machine-readable processing instructions. When executed by the processing system 702, software 704 directs processing system 702 to operate as described above for the elements of communication networks 200 or 300.

The invention claimed is:

1. A call processing system in a destination network associated with a destination signaling protocol, the call processing system comprising:
   an interface configured to receive first signaling for a first call placed by a first user from a first device in a first source network, wherein the first signaling indicates a first source signaling protocol associated with the first source network;
   the interface further configured to receive second signaling for a second call placed by a second user from a second device in a second source network, wherein the second signaling indicates a second source signaling protocol associated with the second source network; and
   a processor configured to determine a status for the first call, determine a first event by which the status for the first call is conveyed to the first user, determine a first parameter based on the first event and the first source signaling protocol, and generate third signaling indicating the first parameter;
   the processor further configured to determine a status for the second call, determine a second event by which the status for the second call is conveyed to the second user, determine a second parameter based on the second event and the second source signaling protocol, and generate fourth signaling indicating the second parameter, wherein the second event is the same type of event as the first event and the second parameter is different than the first parameter.

2. The call processing system of claim 1 where the first source network generates event signaling based on the first parameter to trigger the first event on the first device.

3. The call processing system of claim 1 where the destination signaling protocol is different than the first source signaling protocol.

4. The call processing system of claim 3 where the destination signaling protocol is SS7 and the first source signaling protocol is SIP.

5. The call processing system of claim 3 where the destination signaling protocol is SS7 and the first source signaling protocol is H.323.

6. The call processing system of claim 5 where the second source signaling protocol is SIP.

7. A method of operating a call processing system in a destination network associated with a destination signaling protocol, the method comprising:
   receiving first signaling for a first call placed by a first user from a first device in a first source network, wherein the first signaling identifies a first source signaling protocol;
   receiving second signaling for a second call placed by a second user from a second device in a second source network, wherein the second signaling identifies a second source signaling protocol;
   determining a status for the first call;
   determining a first event by which the status for the first call is conveyed to the first user;
   determining a first parameter based on the first event and the first source signaling protocol;
   generating third signaling indicating the first parameter;
   determining a status for the second call;
   determining a second event by which the status for the second call is conveyed to the second user, wherein the second event is the same type of event as the first event;
   determining a second parameter based on the second event and the second source signaling protocol, wherein the second parameter is different than the first parameter; and
   generating fourth signaling indicating the second parameter.

8. The method of claim 7 where the first source network generates event signaling based on the first parameter to trigger the first event on the first device.

9. The method of claim 7 where the destination signaling protocol is different than the first source signaling protocol.

10. The method of claim 9 where the destination signaling protocol is SS7 and the first source signaling protocol is SIP.

11. The method of claim 9 where the destination signaling protocol is SS7 and the first source signaling protocol is H.323.

12. The method of claim 11 where the second source signaling protocol is SIP.

13. A communication network comprising:
   a first source call processing system associated with a first source signaling protocol configured to receive a first call placed by a first user from a first source device in a first source network, generate a first signaling for the first call, wherein the first signaling identifies the first source signaling protocol, receive fourth signaling, and generate first event signaling based on a first parameter, whereby the first source device generates a first event;
   a second source call processing system associated with a second source signaling protocol configured to receive a second call placed by a second user from a second source device in a second source network, generate a fifth signaling for the second call, wherein the fifth signaling identifies the second source signaling protocol, receive eighth signaling, and generate second event signaling based on a second parameter, whereby the second source device generates a second event which is the same type of event as the first event;

a gateway configured to receive the first signaling, generate a second signaling indicating the first source signaling protocol based on the first signaling, the first source signaling protocol, and a destination signaling protocol, receive third signaling, and generate the fourth signaling based on the third signaling, the first parameter, the destination signaling protocol and the first source signaling protocol;

the gateway further configured to receive the fifth signaling, generate a sixth signaling indicating the second source signaling protocol based on the fifth signaling, the second source signaling protocol, and the destination signaling protocol, receive seventh signaling, and generate the eighth signaling based on the seventh signaling, the second parameter, the destination signaling protocol and the second source signaling protocol; and a destination call processing system configured to receive the second signaling, determine a status for the first call, determine the first event by which the status of the first call is conveyed to the first user, determine a first parameter based on the first event and the first source signaling protocol, and generate the third signaling indicating the first parameter;

the destination call processing system further configured to receive the sixth signaling, determine a status for the second call, determine the second event by which the status of the second call is conveyed to the second user, determine a second parameter based on the second event and the second source signaling protocol, and generate the seventh signaling indicating the second parameter, where the second parameter is different than the first parameter.

\* \* \* \* \*